United States Patent [19]

Nims et al.

[11] 3,852,787
[45] Dec. 3, 1974

[54] THREE DIMENSIONAL PICTURES AND METHOD OF COMPOSING THEM

[75] Inventors: Jerry Curtis Nims, Atlanta, Ga.; Allen Kwok Wah Lo, Kowloon, Hong Kong

[73] Assignee: Dimensional Development Corporation, Atlanta, Ga.

[22] Filed: July 16, 1973

[21] Appl. No.: 379,387

Related U.S. Application Data

[62] Division of Ser. No. 171,269, Aug. 12, 1971.

[52] U.S. Cl.............. 354/275, 354/202, 242/71.1
[51] Int. Cl.... G03b 17/26, G03b 1/44, G03b 17/28
[58] Field of Search.......... 95/31 R, 31 CA; 242/71, 242/71.1; 352/221, 231

[56] References Cited
UNITED STATES PATENTS

| | | | |
|---|---|---|---|
| 1,921,559 | 8/1933 | Case | 95/31 CA |
| 1,921,560 | 8/1933 | Case | 242/71.1 X |
| 2,731,894 | 1/1956 | Leitz et al. | 95/31 CA |

FOREIGN PATENTS OR APPLICATIONS

| | | | |
|---|---|---|---|
| 635,268 | 9/1936 | Germany | 95/31 R |

Primary Examiner—Robert P. Greiner
Attorney, Agent, or Firm—Newton, Hopkins & Ormsby

[57] ABSTRACT

A three dimensional effect is obtained upon viewing a pair of two dimensional images by providing an image sheet divided into a large number of vertical image bands, within each of which bands there is provided a number of adjacent image sections of the scene being depicted. A lenticular screen overlying the image sheets and located such that each lenticule covers one of the image bands allows left and right eye observations of two different images of the same scene wherein such two images are a stereoscopic pair. The stereoscopic pairs of images may be obtained by simultaneously photographing a scene with a multi-lens camera or with a number of conventional cameras located in side-by-side spaced relation and by having their optical axes parallel, or the composite image sections may all be produced from a single two dimensional image.

2 Claims, 57 Drawing Figures

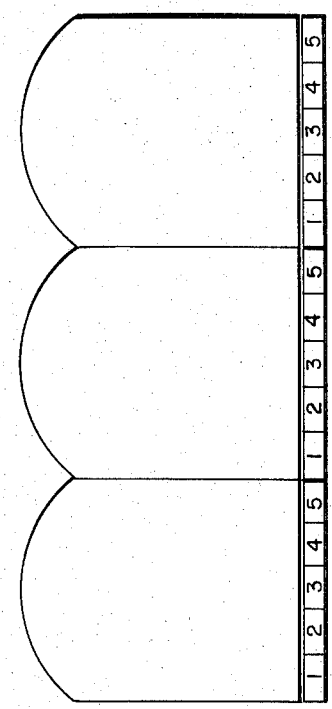
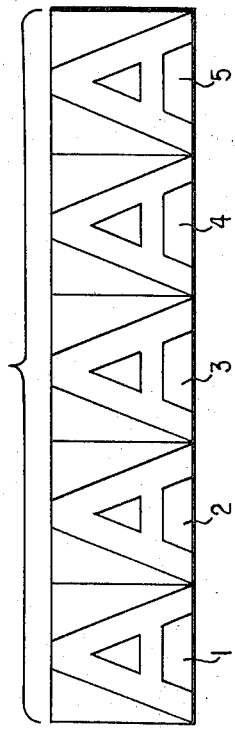
FIG. 14
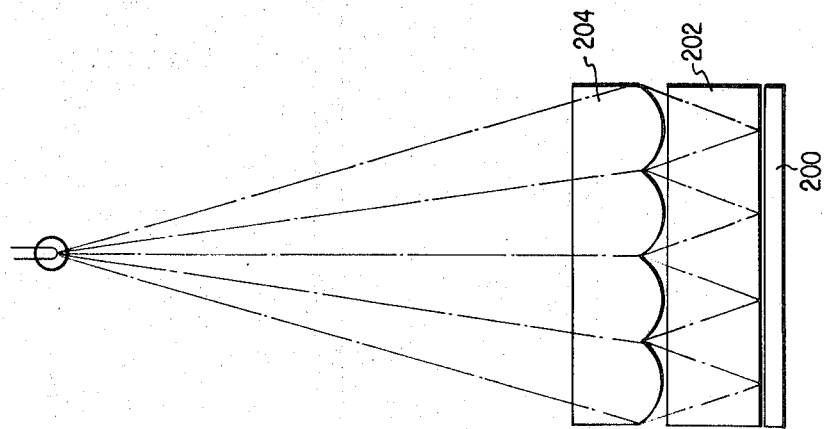
FIG. 13
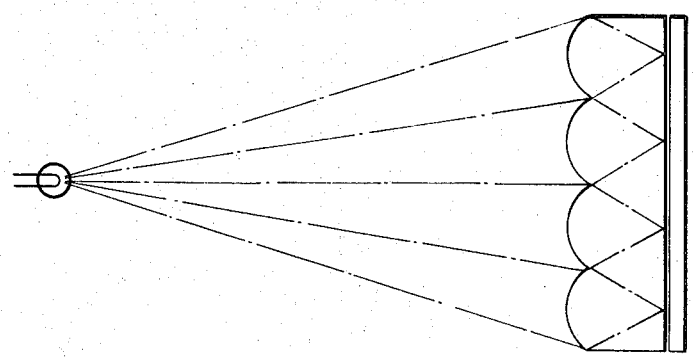
FIG. 12

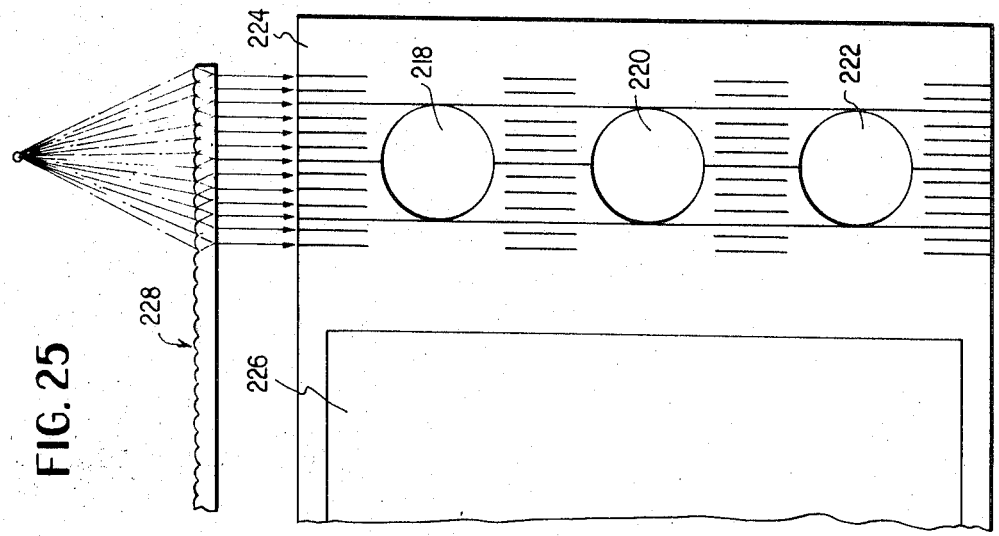
FIG. 25
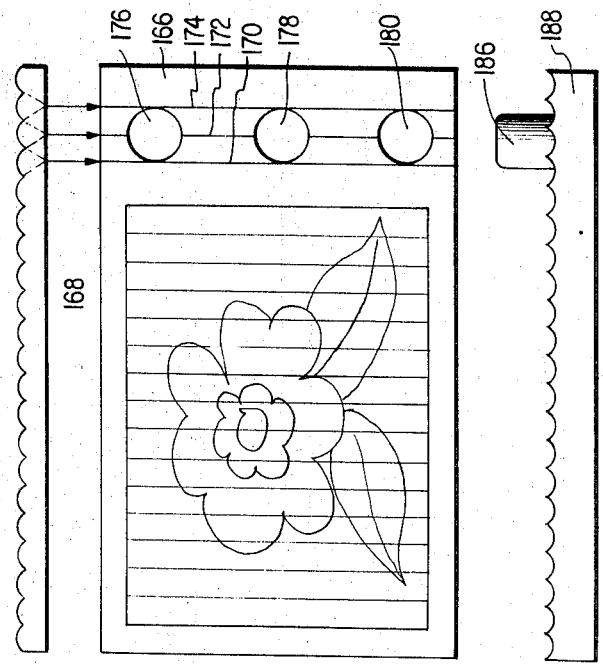
FIG. 22
FIG. 23
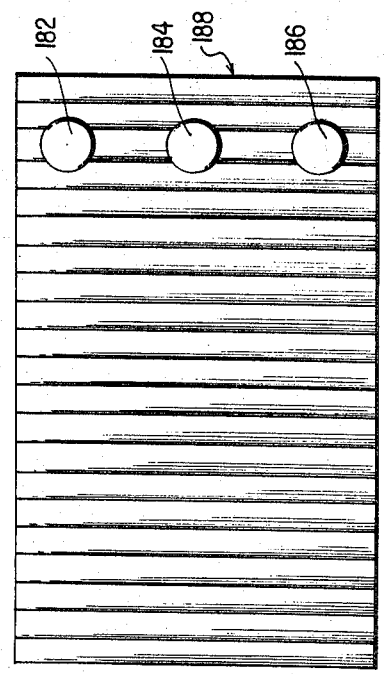
FIG. 24

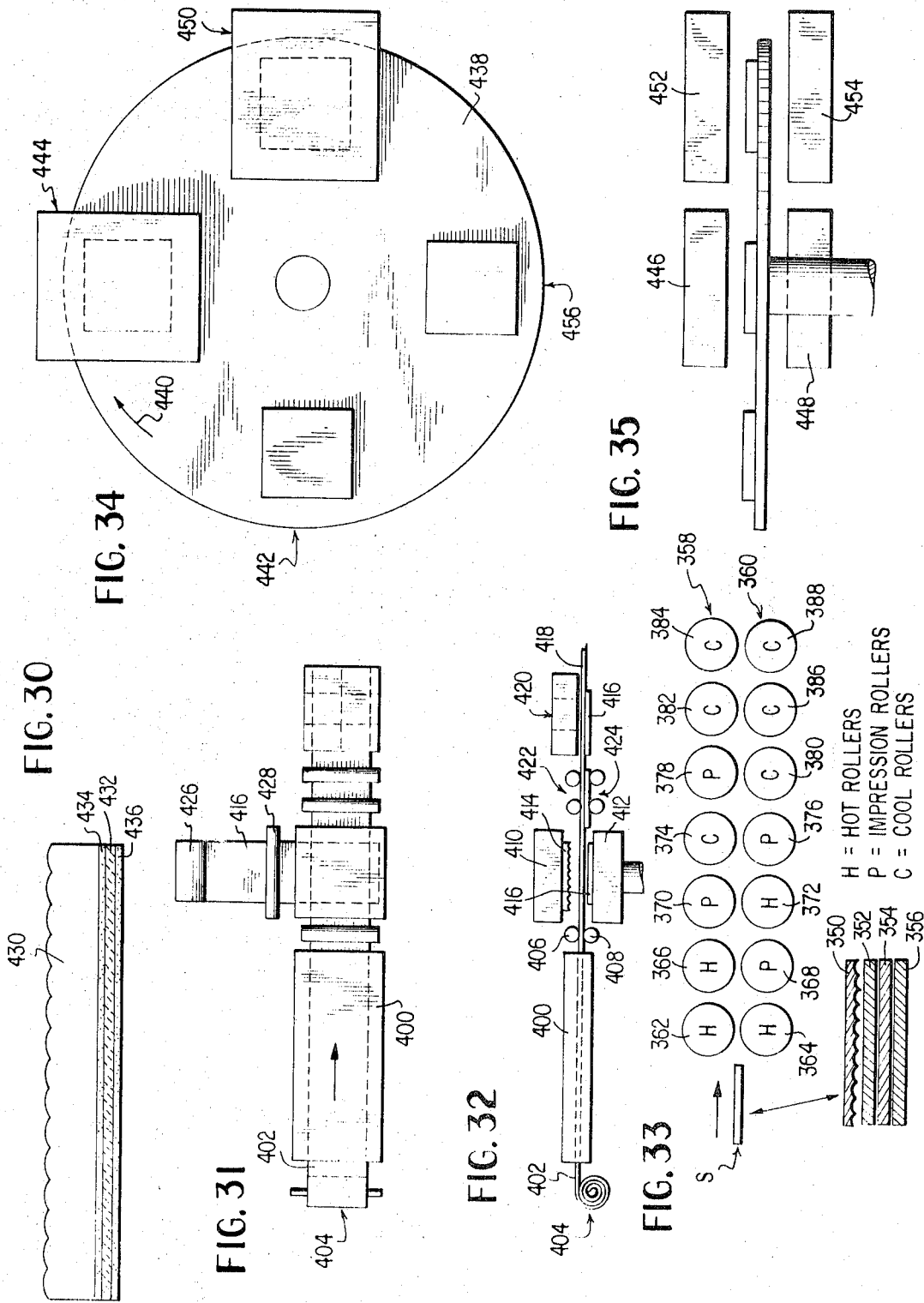

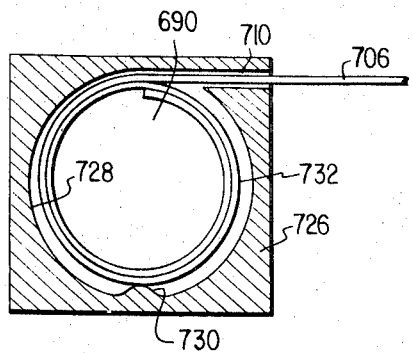
FIG. 44
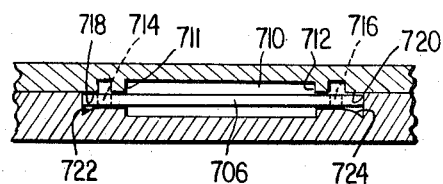
FIG. 45
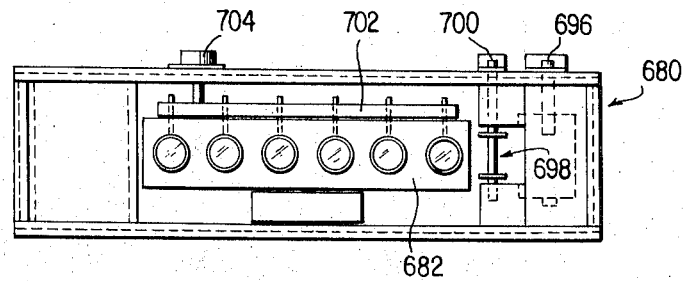
FIG. 46
FIG. 48
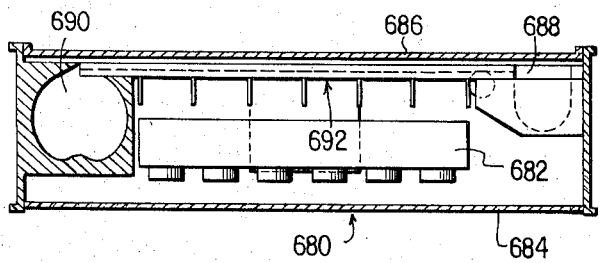
FIG. 47
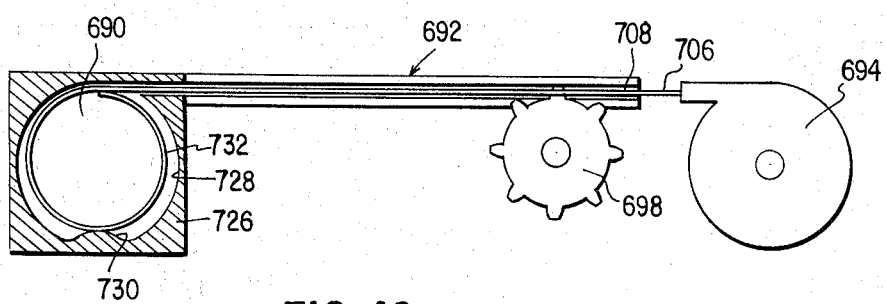
FIG. 49

3,852,787

THREE DIMENSIONAL PICTURES AND METHOD OF COMPOSING THEM

This is a division of application Ser. No. 171,269 filed Aug. 12, 1971.

BACKGROUND OF THE INVENTION

Many efforts have been made to produce autostereoscopic pictures. Most systems involve the use of a 3 D camera and thus are characterized by the expense attendant thereto. Other techniques have also been employed, but in each, the effects produced either are not wholly satisfactory or require inordinate expense to achieve the desired effect.

BRIEF SUMMARY OF THE INVENTION

The present invention involves the method and apparatus for providing autostereoscopic pictures wherein conventional cameras may be utilized to produce the desired effect.

The three dimensional pictures according to the present invention are a specially composed two dimensional image having a lenticular screen superimposed thereon. The two dimensional image is composed of a plurality of image bands, each of which image band is composed of a plurality of adjacent lineiform image sections disposed in side-by-side relationship each such image band underlying one lenticule of the lenticular screen superimposed upon the image. The lineiform image sections are either similar sections of a plurality of images obtained from exposures at different lateral positions taken along parallel axes or they may be produced by special composing techniques from a single negative or positive image. The lineiform image sections of each image band are in stereoscopic relationship so that the right and left eyes of a viewer will simultaneously see different aspects of the same total image.

In contrast to conventional techniques wherein a single object of the scene being photographed by a 3D camera is selected as the central object within the view of each camera angle so as to render this object in the center plane of the picture, the present apparatus and technique does not require any such center plane relationship for, according to the composing techniques involved herein, any object may be selected for the center plane of the three dimensional image. In this way, any selected object of a scene may be located in the plane of the image sheet with foreground objects floating out of the picture with respect to such image plane and background objects receding from such image plane.

Further, the present invention involves a technique of composing three dimensional images viewed through a lenticular overlying screen wherein exact registry between the image bands and the lenticules is assured so as to produce a clear, sharp and unambiguous three dimensional picture.

The present invention also is directed to component devices utilized in association with the apparatus according to the present invention.

BRIEF DESCRIPTION OF THE DRAWING FIGURES

Figure 4:
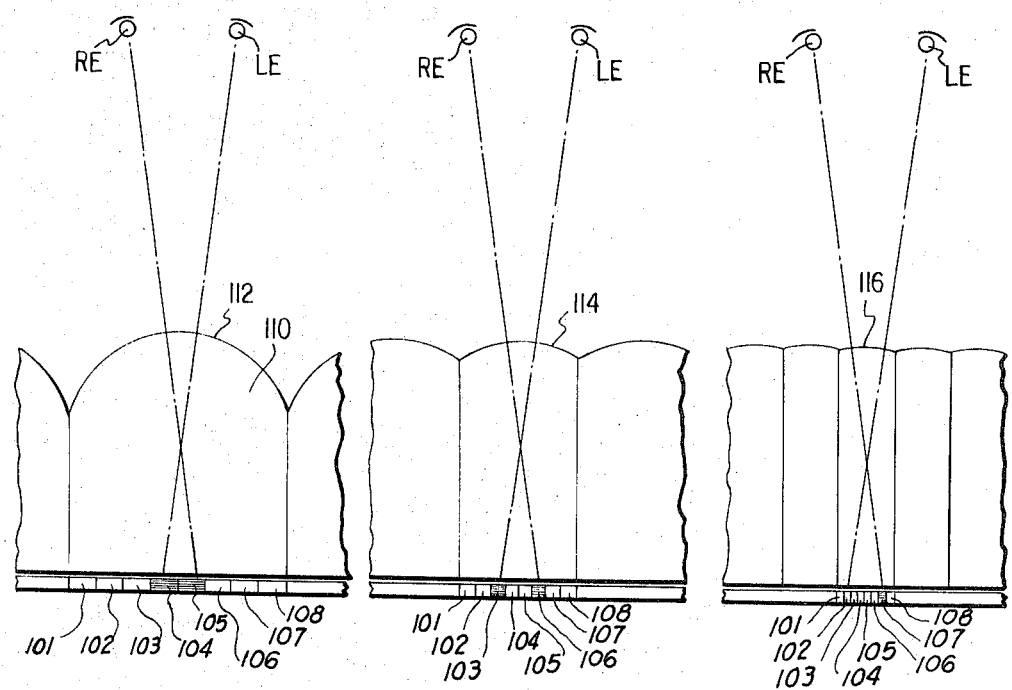
Figure 5:
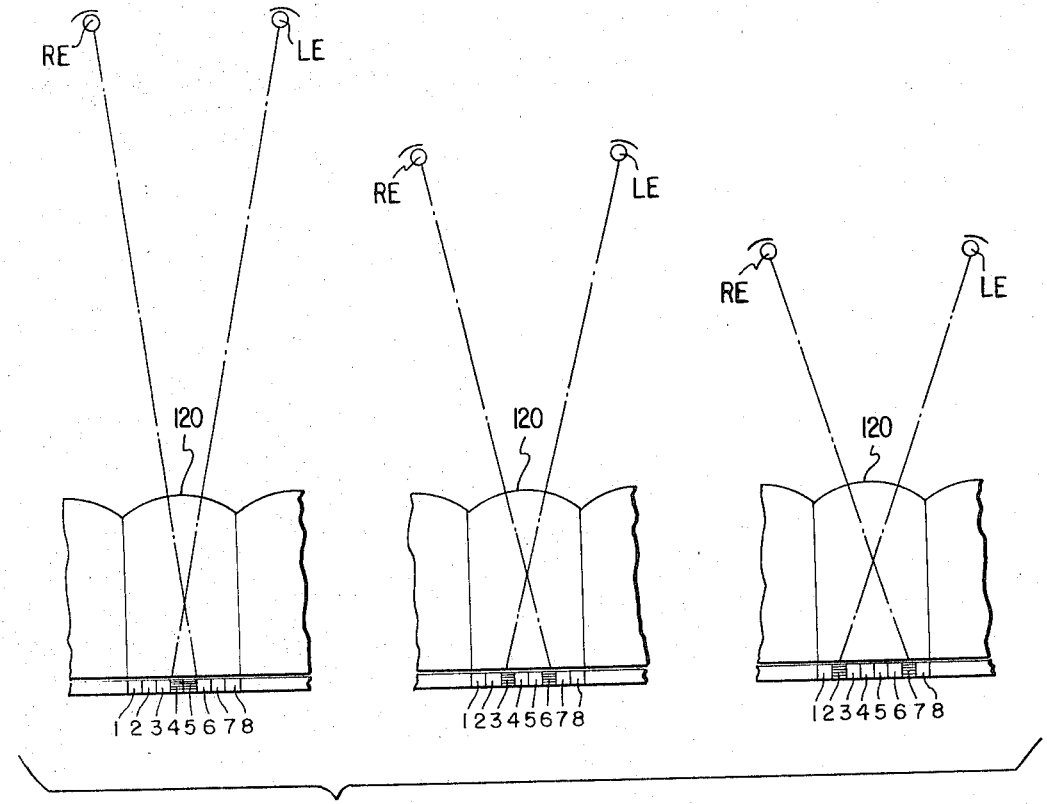
Figure 6:
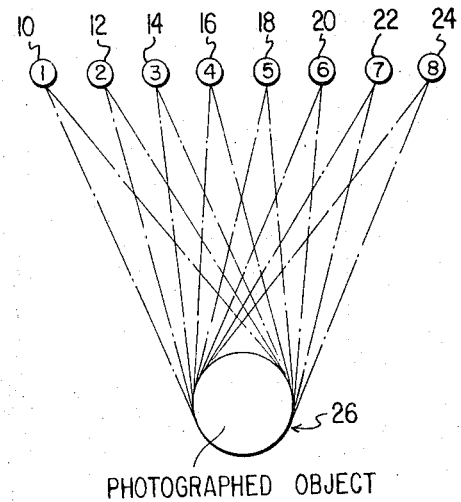
Figure 7:
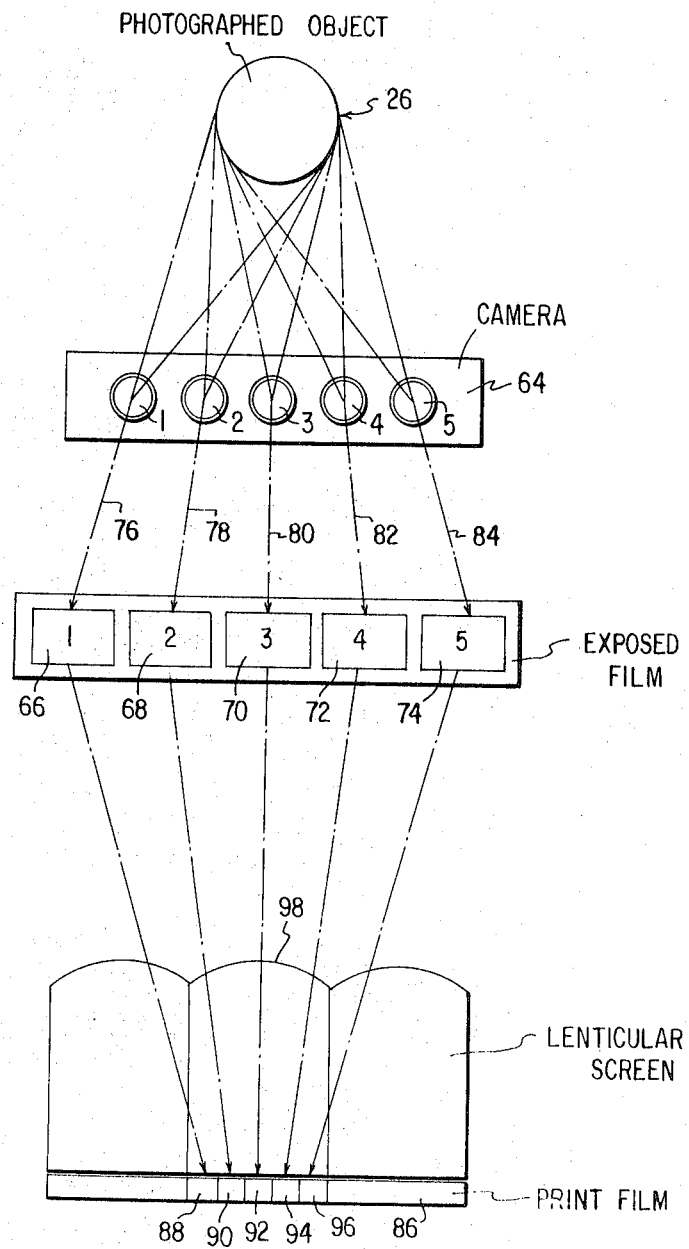
Figure 9:
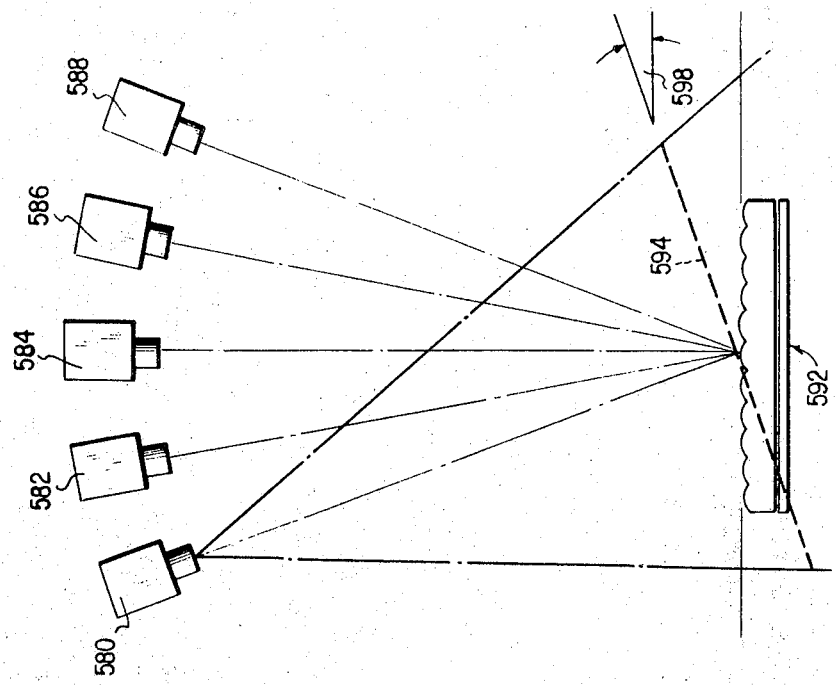
Figure 8:
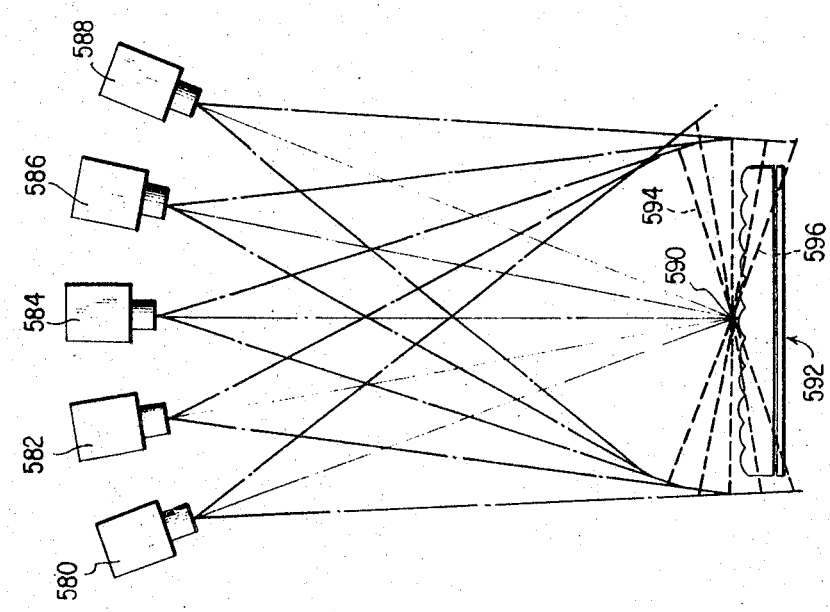
Figure 10:
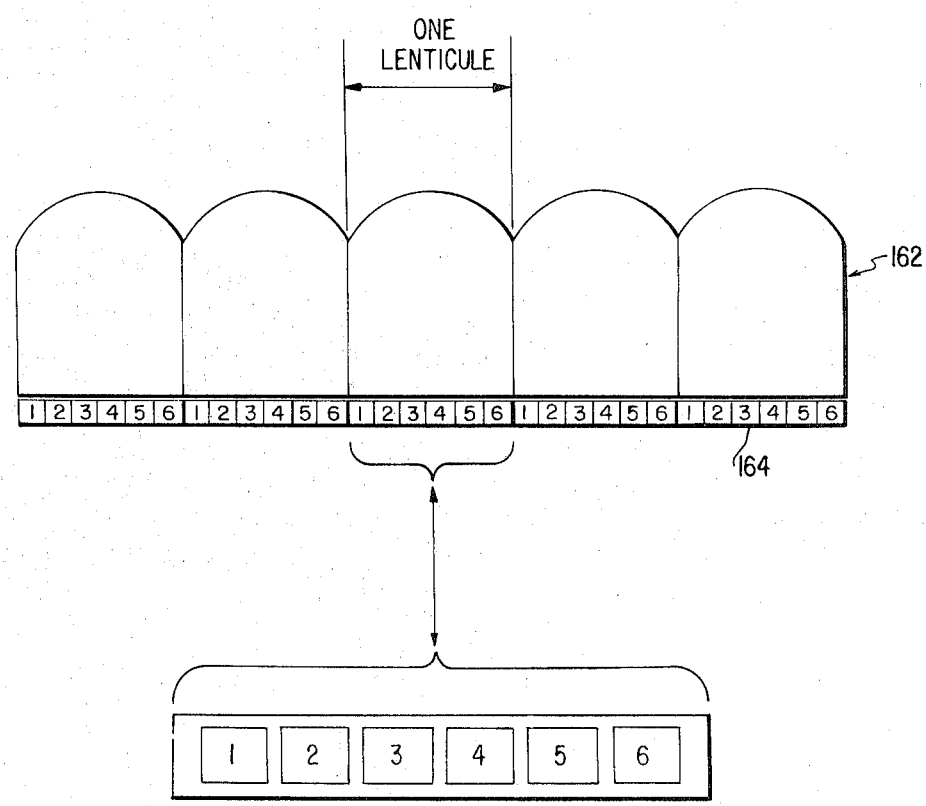
Figure 11:
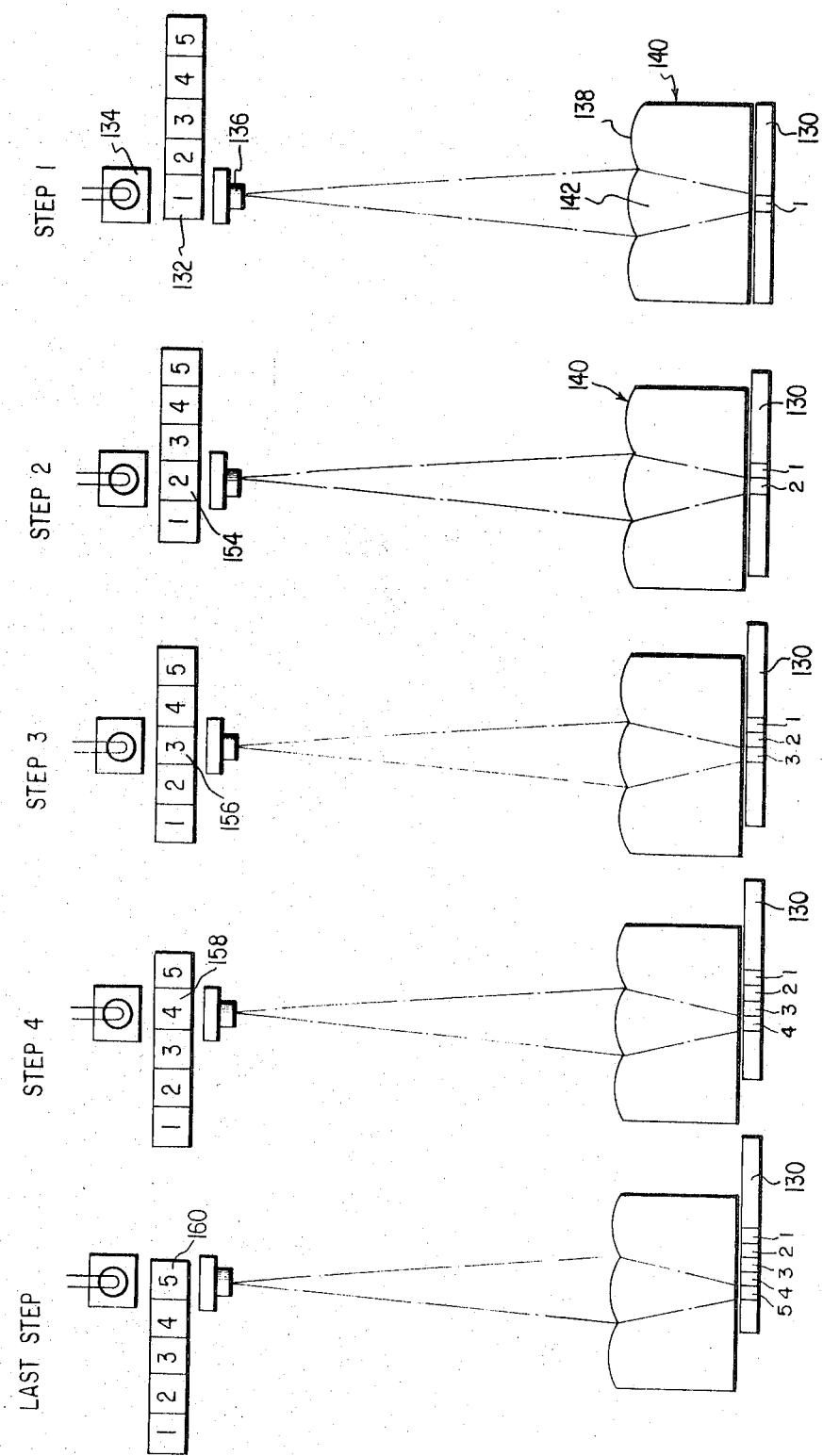
Figure 18:
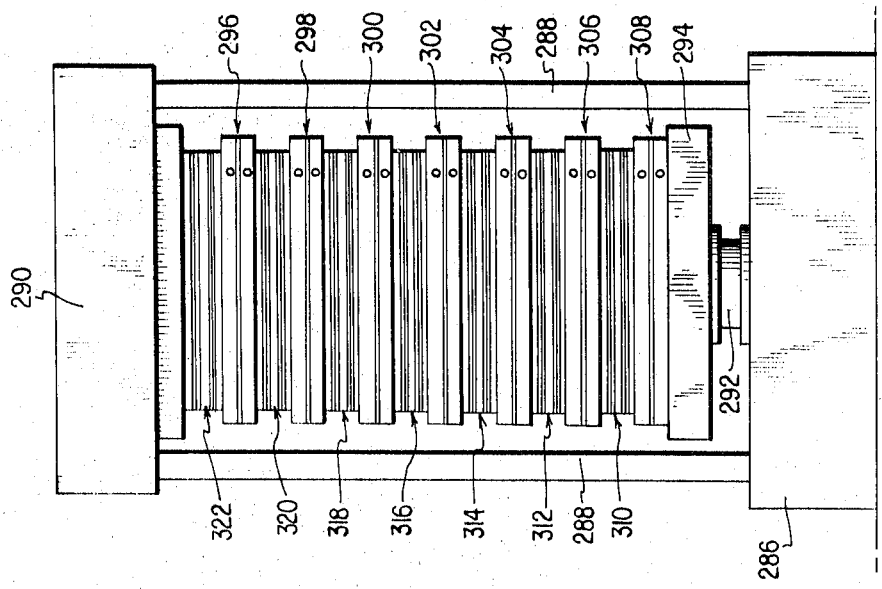
Figure 15:
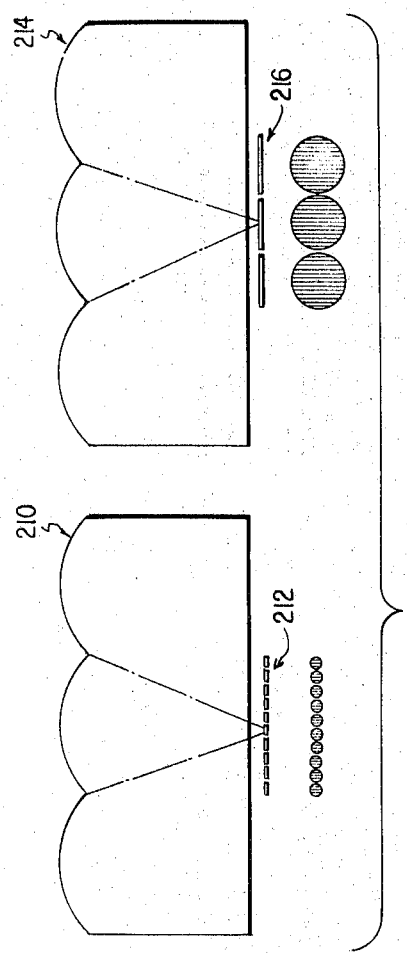
Figure 16:
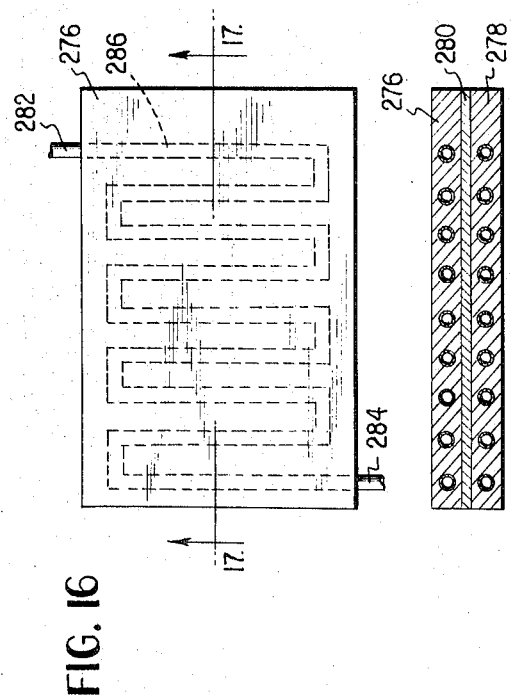
Figure 17:
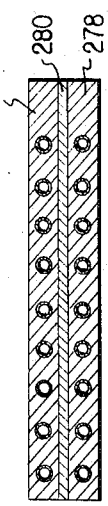
Figure 20:
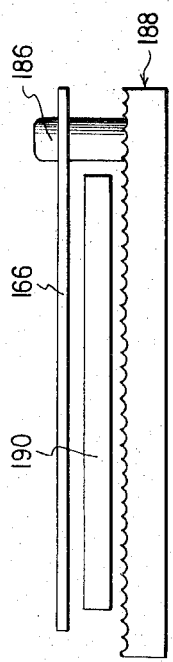
Figure 21:
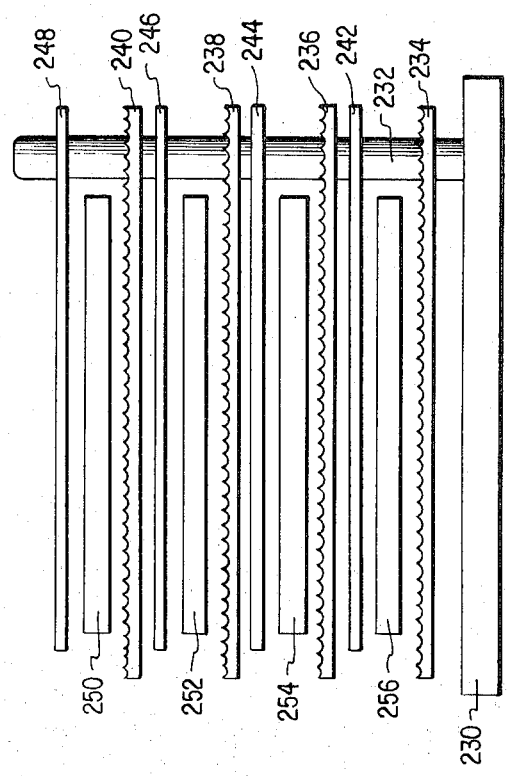
Figure 19:
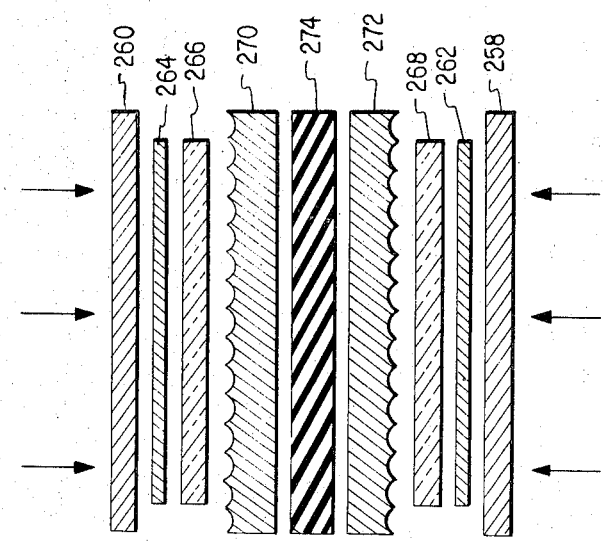
Figure 26:
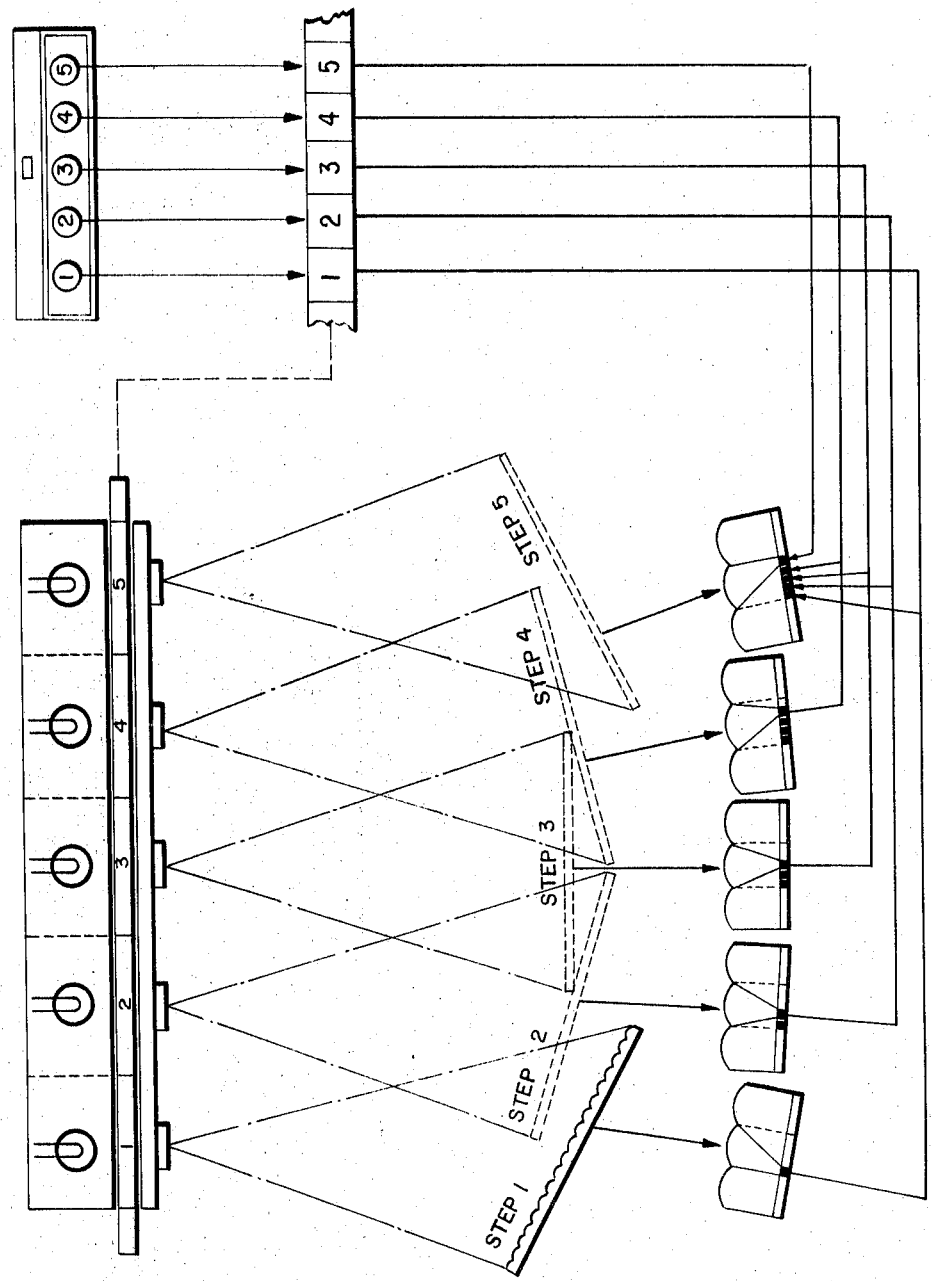
Figure 29:
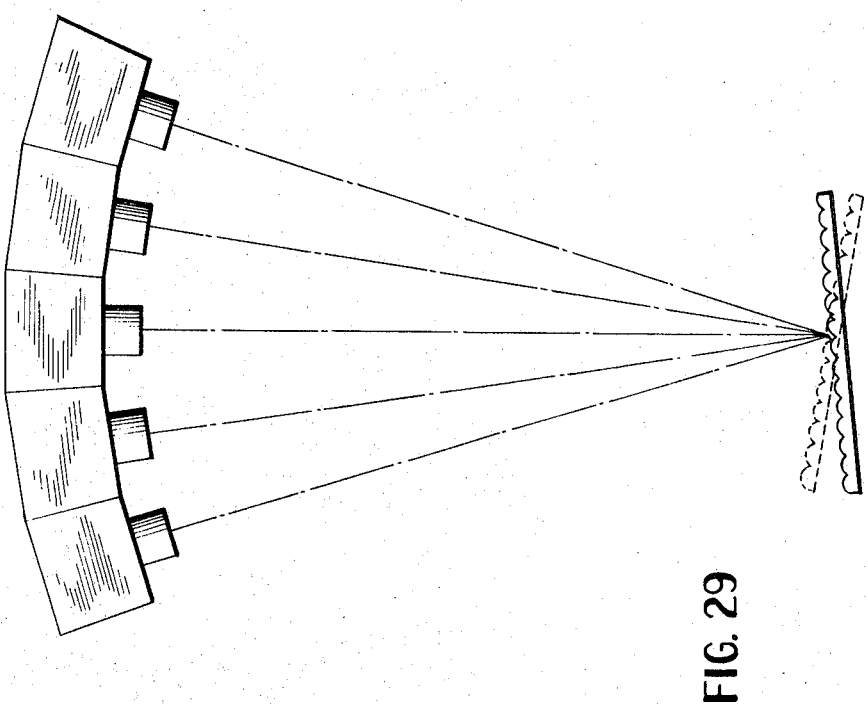
Figure 27:
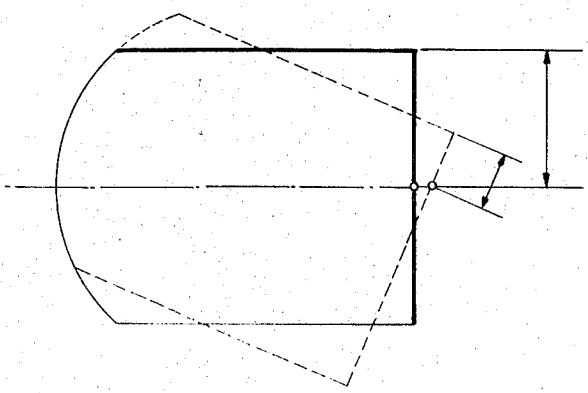
Figure 28:
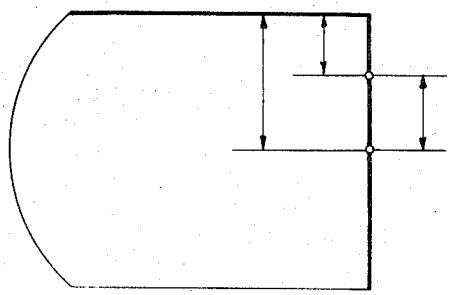
Figure 36:
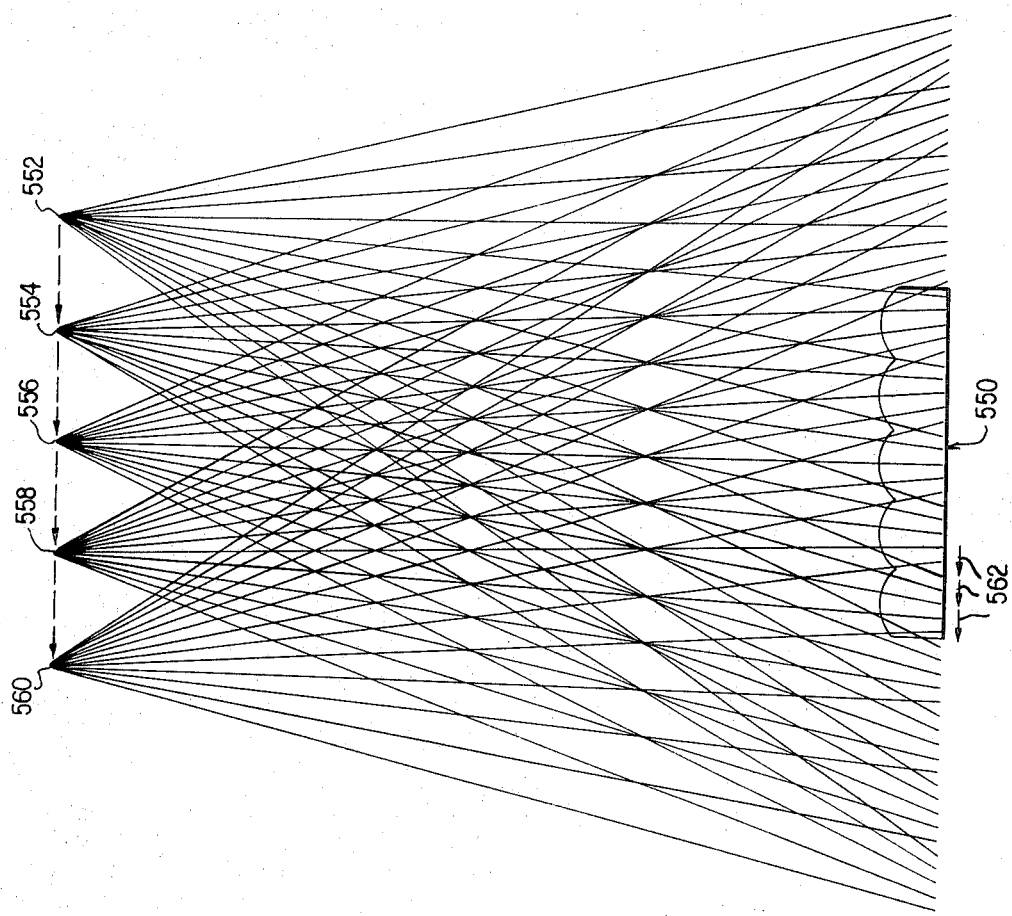
Figure 37:
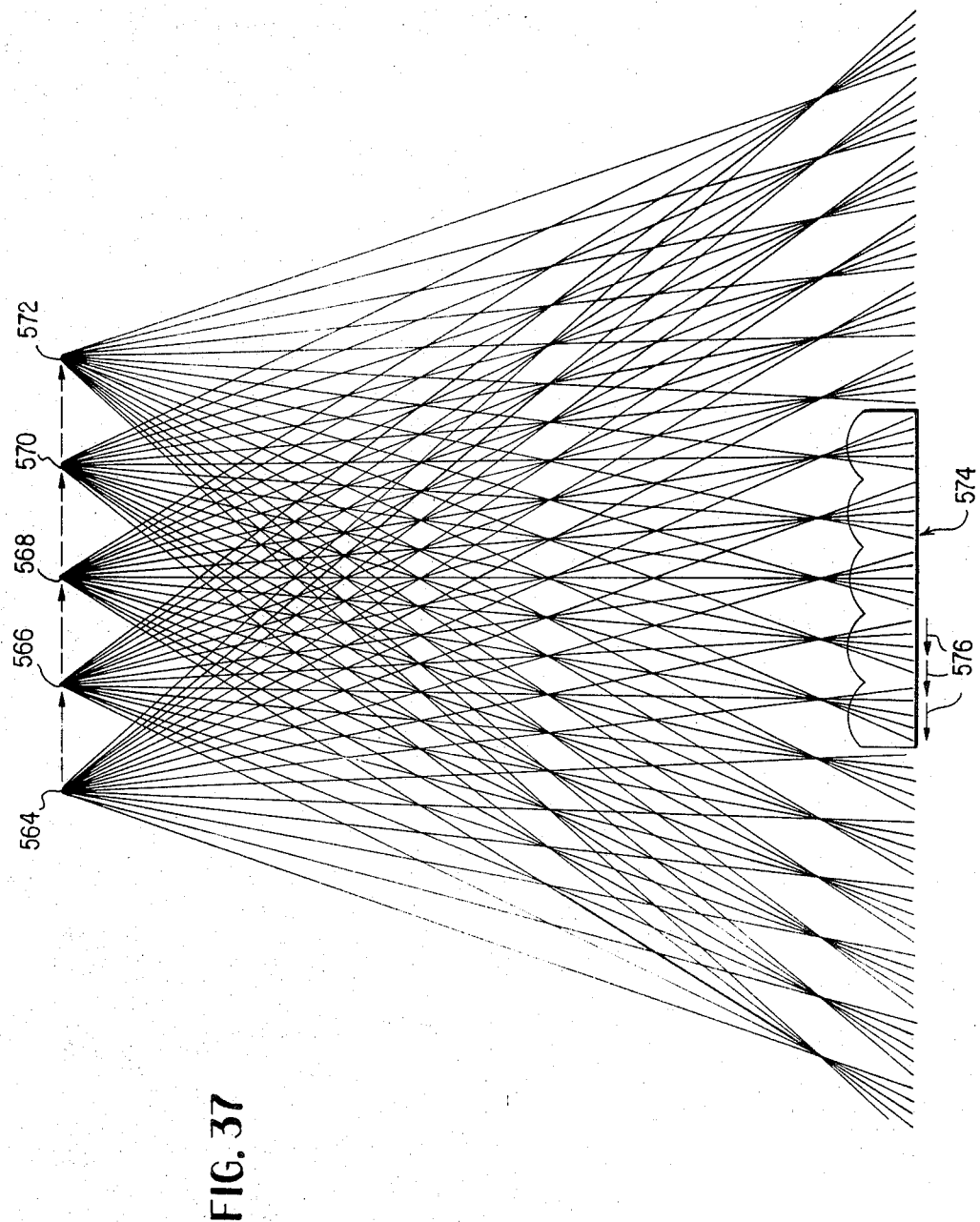
Figure 39:
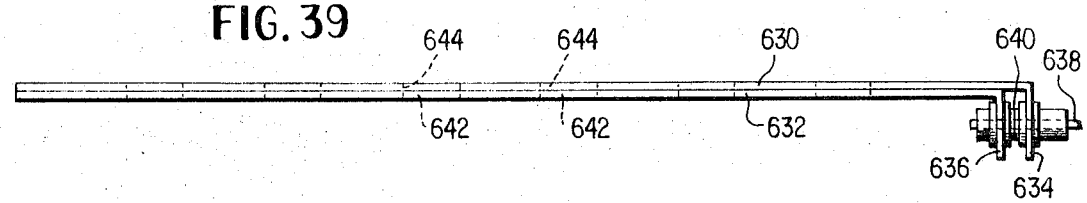
Figure 40:
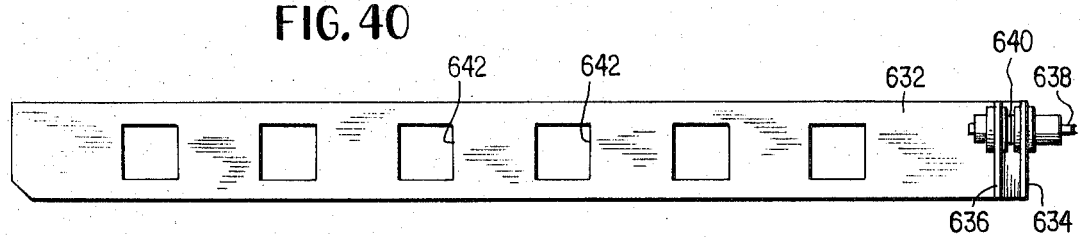
Figure 40A:
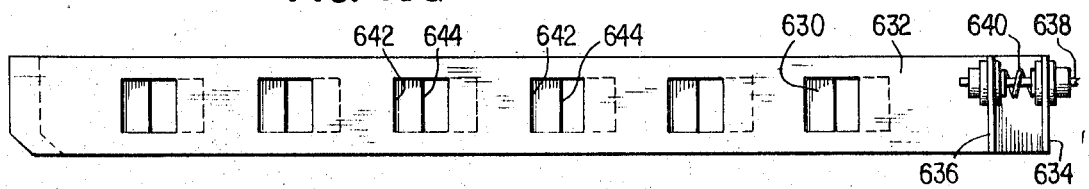
Figure 41A:
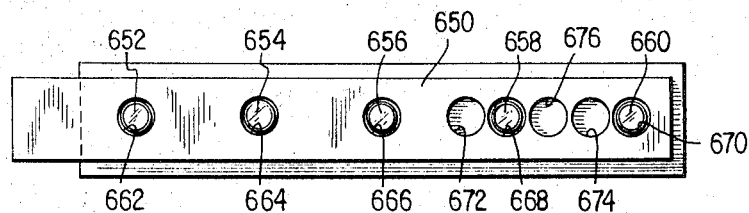
Figure 41B:
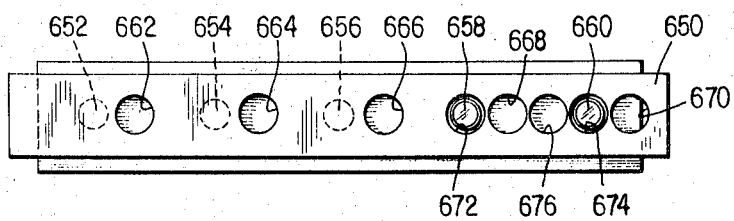
Figure 41C:
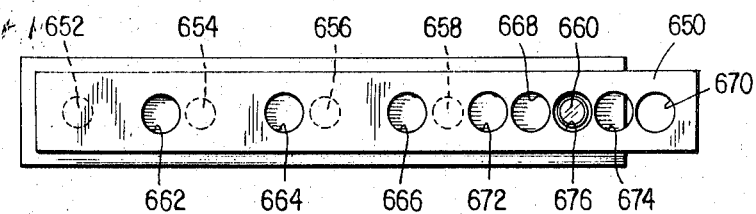
Figure 42A:
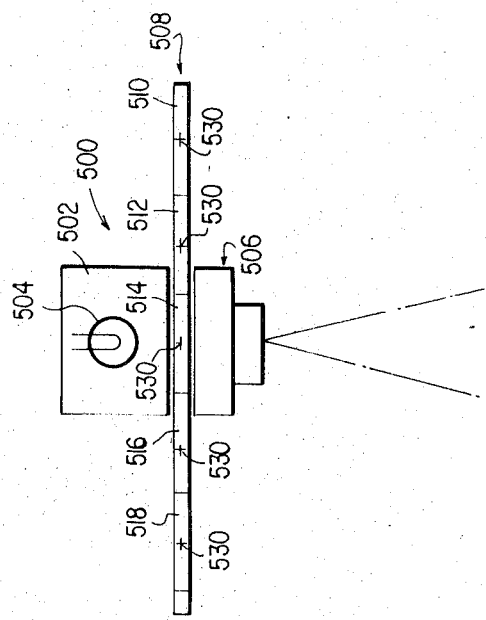
Figure 42B:
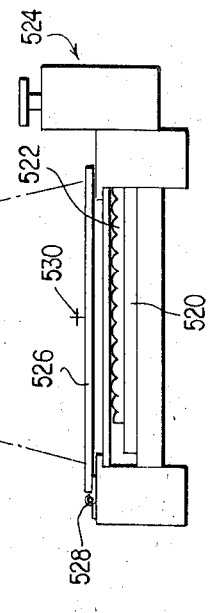
Figure 42C:
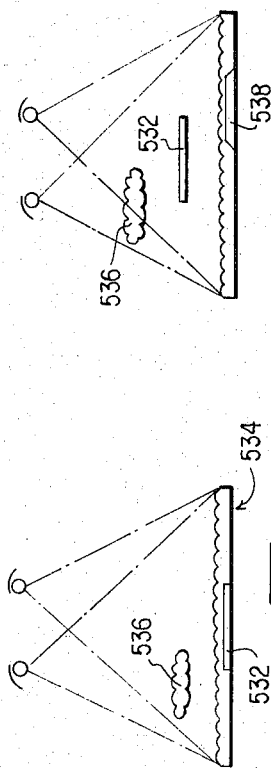
Figure 43:
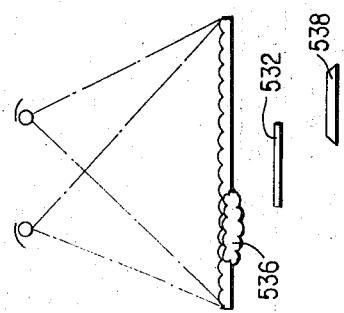

FIG. 4 illustrated certain principles of the present invention with relation to the curvature of the lenticular screens;

FIG. 5. is a view similar to FIG. 4 and showing the effect of changing the viewing distance with the same lenticular arrangement;

FIG. 6 is a diagrammatic view illustrating the stereoscopic effect achieved by the plural cameras with respect to a photographed object;

FIG. 7 is a composite view illustrating the principles of composition according to the present invention;

FIG. 8 shows a method of composing a three dimensional picture from negatives or positives;

FIG. 9 is a view similar to FIG. 8 showing a modification of the composing techniques;

FIG. 10 is a view showing certain principles according to the present invention;

FIG. 11 is a view showing sequential steps in composing a three dimensional picture according to the present invention;

FIG. 12 is a view illustrating one form of the picture constructions;

FIG. 13 is a view illustrating a modified form of the image system;

FIG. 14 is a view illustrating the lateral compression of the lineiform image sections;

FIG. 15 is a view showing utilization of the invention in association with half tone images;

FIG. 16 is a view illustrating the construction of one of the platens for forming the lenticular screens;

FIG. 17 is a transverse sectional view substantially along section line 17—17 of FIG. 16;

FIG. 18 is a view illustrating the manner of simultaneously forming a plurality of composites;

FIG. 19 is a diagrammatic, exploded view illustrating the composition of the component parts for forming the lenticular screen on the image;

FIG. 20 is a view illustrating the manner of obtaining proper alignment between the lenticular screen-forming member and the image sheet;

FIG. 21 is a view similar to FIG. 20 but showing a stacked array of components;

FIG. 22 is a view illustrating the principles of the alignment of lenticular screen-forming member and the image sheet;

FIG. 23 is a side elevational view of the alignment member;

FIG. 24 is a plan view of the alignment member shown in FIG. 23;

FIG. 25 is a view illustrating some of the principles of the alignment mechanism;

FIG. 26 is a diagrammatic view illustrating the steps of composing a three dimensional picture according to another modification of the invention;

FIG. 27 is an enlarged diagrammatic view illustrating the rocking principle for composing three dimensional pictures;

FIG. 28 illustrates the manner of shifting in association with the images achieved by the method of FIG. 27;

FIG. 29 illustrates diagrammatically a further method of composing pictures according to the present invention;

FIG. 30 is a cross section taken through a finished 3 D picture;

FIG. 31 is a view illustrating the components of apparatus for forming the lenticular screen in association with image sheets;

FIG. 32 is a side elevational view of the assembly shown in FIG. 31;

FIG. 33 is a diagrammatic view illustrating a modification of the hot rolling process;

FIG. 34 is a plan view of a continuous production composing mechanism according to the present invention;

FIG. 35 is a side elevational view of the assembly shown in FIG. 34;

FIG. 36 is a diagrammatic view illustrating the manner of composing a three dimensional image picture from a single two dimensional positive or negative;

FIG. 37 is a view similar to FIG. 36 but showing a further technique of this method of composing;

FIGS. 38a–d illustrate a common shutter mechanism for a multi-lens camera in various positions thereof to achieve desired effects in accordance with the present invention;

FIG. 39 is a side elevational view of another form of shutter mechanism;

FIG. 40 is an elevational view of the shutter mechanism of FIG. 39;

FIG. 40a is a view similar to FIG. 40 but showing an intermediate position of the shutter mechanism;

FIGS. 41a–c illustrate an exposure-controlling device for use with the shutter of FIGS. 39–40a;

FIGS. 42a–c illustrate certain principles of composition according to the present invention;

FIG. 43 illustrates apparatus for composing pictures according to one embodiment of the invention;

FIG. 44 is a cross sectional view showing a take-up spool portion for the film in accord with the present invention;

FIG. 45 is a cross sectional view taken through the film guiding mechanism;

FIG. 46 is a view illustrating the plural camera arrangement with the film take-up guide mechanisms shown in FIGS. 44 and 45;

FIG. 47 is a horizontal section taken through the apparatus of FIG. 46 illustrating certain details of component arrangement;

FIG. 48 is a transverse vertical section taken through the apparatus of FIG. 46 showing further detailed relationships; and FIG. 49 is a view illustrating the film feed and film take-up as well as the film supply mechanisms.

DETAILED DESCRIPTION OF THE INVENTION

Referring at this time more particularly to FIG. 6, the reference numerals 10, 12, 14, 16, 18, 20, 22 and 24 diagrammatically represent therein a plurality of cameras which, as will hereinafter be described, have their optical axes disposed in parallelism and within each field of view there is an object 26 such that simultaneous exposure of the film in each of the cameras will produce image scenes containing such photographed object 26. If, as described above, the optical axes of the cameras are parallel, the relative position of the photographed object 26 in each image will be different and, as are indicated by the broken lines in FIG. 6, various of the cameras will have different aspects or views of that object.

Figure 1:
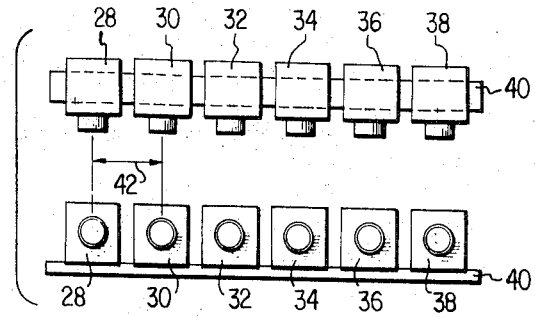
FIG. 1 is a composite view illustrating one method of camera arrangement for obtaining a plurality of negatives for composing three dimensional pictures according to the present invention.

As is illustrated in FIG. 1, one manner of obtaining the photographic negatives described in conjunction with FIG. 6 is to provide a plurality of cameras 28, 30, 32, 34, 36, and 38 in rigidly fixed relationship upon a common mounting base 40 so that the optical axes of the cameras are in parallelism with each other and are spaced apart each by a predetermined distance as indicated by the spacing 42 in FIG. 1. It is to be understood that the cameras have similar lenses with identical focal lengths and identical fields of view so that the images produced thereby as described in conjunction with FIG. 6, will each contain the same angle of view but the view will be different in each case, although containing in each instance certain common objects such as the photographed object 26 described in FIG. 6.

Figure 2:
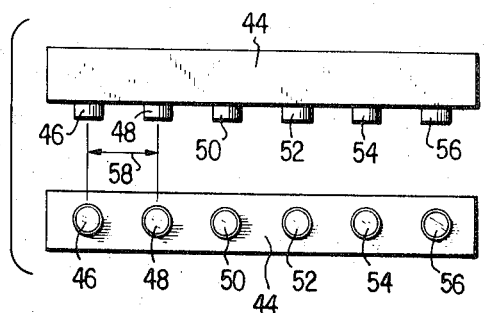
FIG. 2 is a view similar to FIG. 1 but illustrating another camera arrangement.

FIG. 2 illustrates a further form of camera system for achieving the objectives described in conjunction with FIG. 6, and, in this case, includes a common housing 44 mounting a series of lenses 46, 48, 50, 52, 54, and 56 whose optical axes are disposed in spaced parallelism, the spacing being in each case a predetermined spacing indicated by the reference character 58.

Figure 3:
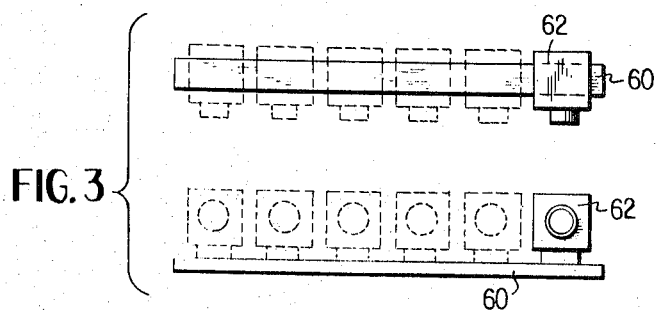
FIG. 3 is a view similar to FIGS. 1 and 2 showing a manner in which a single camera may be utilized for the purposes intended.

A further modification which is acceptable for taking still pictures and producing the requisite images as described in conjunction with FIG. 6 is illustrated in FIG. 3 wherein a common base or supporting track 60 is provided upon which a single camera 62 is adapted to be positioned at the various positions indicated by full and dashed lines in FIG. 3 so as to achieve the requisite number of images of the photographed scene.

The technique of image composition will be seen diagrammatically in FIG. 7 wherein the camera indicated generally by the reference character 64 and having a plurality of lenses as indicated therein simultaneously photographs the object 26, the axes of the optical systems of the cameras being in predetermined spaced and parallel relationship to each other as described hereinabove. The images produced by the individual cameras or, more properly the individual lens systems of the camera 64, are depicted respectively by the reference characters 66, 68, 70, 72 and 74 in FIG. 7 and, as is indicated in general by the broken lines 76, 78, 80, 82 and 84, the position of the photographed object 26 in each field of view in the negative 66–74 will be slightly different because of the spaced parallelism of the optical axes as described. If, now, a photosensitive film 86 is exposed by techniques hereinafter described such that lineiform image sections of the various negative images 66–74 are provided such that the corresponding sections of the several negatives are disposed in Side-by-side relationship as indicated by the reference characters 88, 90, 92, 94 and 96 to occupy the space immediately below one lenticule of the lenticular screen 98, the composite image when viewed as a whole will indicate different aspects of the same scene, dependent upon the point at which the image is viewed.

To illustrate this, reference is had to FIG. 4 wherein it will be seen that the several lineiform image sections 101, 102, 103, 104, 105, 106, 107 and 108 located beneath the lenticule 110 may be viewed in different paired relationships dependent upon the curvature of the lenticules. Thus, at the left portion of FIG. 4, the curvature of the lenticular surface 112 is rather steep and when the observer views with his right and left eyes RE and LE, the adjacent lineiform image sections 104 and 105 are seen in magnified form by that particular lenticule and to cover the lenticular surface 112 thereof with respect to each of the separate eyes of the observer. Each of the lineiform image sections is a stereoscopic pair with respect to each of the others and, in the case shown for left hand side of FIG. 4, the stereoscopic or three dimensional effect is at a minimum because the viewer is simultaneously observing two aspects of the same object only from slightly different angles as provided for by adjacent cameras. The next portion of FIG. 4 illustrates a lenticule curvature 114 which is much more gentle than the curvature at 112 so that the right and left eyes of the observer are now observing lineiform image sections 103 and 106 such that a much more pronounced three dimensional effect is achieved. Lastly, for the right-hand portion of FIG. 4 shows a still shallower lenticular surface 116 such that the observer is now viewing the image sections 102 and 107 with still greater three dimensional effect. It will be understood, of course, that the print film section under each lenticule is composed of lineiform sections which are compressed laterally, the lenticules running in a vertical direction on the image, and that the area beneath each lenticule is provided with stereoscopic pair groups of different sections of the total image such that the right and left eyes of the observer simultaneously observing the entire image, sees, with one eye, one aspect of the scene as taken by one of the cameras whereas the other eye sees another aspect of the same scene so as to produce the auto-stereoscopic effect noted above.

FIG. 5 illustrates the effect of varying viewing distance of the observer with respect to the image member. In FIG. 4, the viewing distance was the same in all three instances shown whereas in FIG. 5, the viewing distances are different in each case whereas the curvature of the lenticular portions as indicated by the reference characters 120 are the same in each case. At the left-hand side of FIG. 5, with a relatively large viewing distance, adjacent stereoscopic pairs are seen by the two eyes of the observer whereas with a shortened viewing distance, as shown in the middle portion of FIG. 5, a greater stereoscopic effect is achieved and, lastly as is shown in the right-hand side of FIG. 5, still greater three dimensional effect is achieved by shortening the viewing distance even more.

FIG. 11 shows the sequence of steps according to one method of the invention for producing the lineiform image sections on the print film 130. In step 1, the first negative 132 is projected by means of the light source 134 and the enlarging lens system 136 so as to focus the lenticular surface 138 of the lenticular screen 140. It will be appreciated that in FIG. 11, the lenticules are grossly enlarged with respect to the total widthwise dimension of the image print film 130 for the purpose of clarity. That is to say, whereas only three lenticules are shown in FIG. 11 in each case, the lenticules of course will be very much more narrow relatively than is depicted so that there will be a great many lenticules extending in side-by-side vertical relationship across the entire print film 130. For the portion of the image scene projected through the enlarger 136 and which is focused upon the lenticular surface 138 and falling upon the single lenticule 142, same will be condensed laterally to focus on the image section 152 and of course, similar portions of the total scene will be projected into the narrowed image sections with respect to each of the other lenticules of the screen 140. After this exposure, the image strip 130 is moved with respect to the lenticular screen 140 such that its next position is one in which its displacement is $w/n$ where w is the width of each lenticule and n is the number of negatives to be used in the total composition. The exposure is then made as before but at this time the second negative 154 being exposed, it being understood that some selected portion of the image scene in each case is located in the identical spot each for all of the negatives exposed after displacement or movement of the print film 130. The object occupying that portion of the image scene which is chosen for the same location when each of the negatives is exposed becomes then the center plane of the picture and objects in the foreground will appear to be floating out of this center plane image whereas background objects will be receding from this center plane image. This process is repeated for each of the other image negatives 156, 158 and 160 which are exposed. The print film now contains the lineiform image sections as described, each group of which covers a distance or width equal to the width of a lenticle through which, when the scene is viewed, the three dimensional effect will be produced due to the different aspects observed by the right and left eyes of the observer. This relationship is diagrammatically illustrated in FIG. 10 but, here again, the number of lenticles in the lenticular screen 162 with respect to the total width of the image film 164 is very much reduced with respect to the actual number of lenticles which will be involved in the total image scene. FIG. 14 illustrates the lateral compression of the lineiform image sections with respect to each one of the groups of the lineiform image sections.

The print film with lineiform image sections, suitably developed, may form the image-producing member in association with a lenticular screen overlying and properly registered therewith. In what follows, it will be understood however that the image-producing member or image strip may take other forms as well. For example, it may be in the form of a transparency, in the form of a half-tone, or in any form produced by well-known and conventional printing processes. The term "image strip" is used loosely hereinafter to refer to any and all of these conventionally-derived image members.

What remains to be done now is to provide the image strip having the stereoscopic pair groups of lineiform image sections thereon with a lenticular screen covering in precisely oriented relationship thereto and, for this purpose, the techniques illustrated in FIGS. 22 and 25 may be utilized.

As shown in FIG. 22, the image strip member 166 is of greater widthwise dimension than the image scene indicated by the reference character 168 and, simultaneously with exposure of one of the frame of the image section 168, precisely located guide lines 170, 172 and 174 are also exposed whereafter openings or holes 176, 178 and 180 are cut in precisely oriented relationships between the outer lines 170 and 174, substantially as is shown. The locations and spaces of the holes 176, 178 and 180 corresponding exactly with the location and diameters of the locating posts 182, 184 and 186 of the lenticular screen-forming die 188 indicated in FIGS. 23 and 24. Then, as is shown in FIG. 20, if the image strip 166 is located on the positioning posts 182, 184 and 186 as is shown with a synthetic resinous material sheet 190 being interposed between the image strip 166 and the die 188 as shown, and by subjecting this sandwich to heat and pressure, the lenticular surface embossed upon the external surface of the sheet 190 will form a lenticular pattern exactly in alignment with the lineiform image sections so as to avoid any possibility of misalignment.

The finished product will now be an image strip having a lenticular screen integrally bonded thereto in which the lenticles are in the precisely aligned relationship with respect to the lineiform image stereoscopic group sections necessary to produce the three dimensional autostereoscopic image scene described hereinabove. It will be appreciated, also, that instead of composing the image sheet by an overlying lenticular screen through which the sequential images are exposed, as described above and as is shown in FIG. 12, the same effect may be applied as is shown in FIG. 13 wherein the image strip 200 is covered by a plate of optical glass 202 and the lenticular screen 204, inverted in this case, is utilized to condense the images and produce the lineiform image sections as described hereinabove upon successive exposures of the various negatives utilized to compose the entire or total three dimensional image scene.

FIG. 15 illustrates the fact that half-tone images may be provided to produce the three dimensional effects according to the present invention also. In the left-hand side of FIG. 15, the lenticular screen 210 condenses the half-tone dots indicated generally by the reference character 212 in the requisite sections of the image strip, not shown, wherein many half-tone dots are located in side-by-side relationship beneath each lenticular section. In the right-hand side of FIG. 15, the composing screen 214 condenses much larger image dot groups 216, the difference between the two portions of FIG. 15 essentially being only in the size of the image dots. For the purposes of this invention, when a half-tone image is used as the image strip, it is preferred to use fine or small image dots because of the sharper and more detailed 3 D picture which results therefrom.

FIG. 25 shows an enlarged view of FIG. 22. In FIG. 25, the portion 226 is of course the image area and the guide lines are formed by exposing guide line images through the lenticular composing screen 228, as described hereinbefore.

FIG. 21 illustrates the method in which gangs of 3 D pictures may be formed simultaneously and is particularly adapted for making 3 D pictures from the image strips described above. In this figure, a base 230 mounts a plurality of precisely located aligning posts or pins 232 which are received through the precisely located apertures of a series of lenticular screen-forming dies 234, 236, 238 and 240 and in the image strips 242, 244, 246 and 248 stacked as shown in FIG. 21 and between each which pair of image members and die members there is provided a thermoplastic synthetic resinous material having optical characteristics, such sheets being indicated by the reference characters 250, 252, 254 and 256. This entire assemblage may now be subjected to heat pressure simultaneously to form the plurality of image devices or members which consist of the image sheet and intimately bonded thereto the overlying lenticular screen for producing the three dimensional effect in each case.

To assure uniform pressure throughout the flat formed processes described, the arrangement shown in FIG. 19 may be utilized. In FIG. 19, pressure plate members are indicated by the reference characters 258 and 260 which are used to compress the elements therebetween. Two image strips 262 and 264 are shown as well as two synthetic resinous optical material sheets 266 and 268 and the lenticular screen-forming dies 270 and 272. A heating element 274 is provided between the two dies 270 and 272 so as to assure that the dies are at the proper temperature when the two plates 258 and 260 are pressed toward each other and heat is thereby applied to allow the lenticle formation to occur on one surface of each of the strips 266 and 268 and, further, to allow these strips 266 268 286 to adhere intimately and physically to the image member 262 and 264.

FIGS. 16 and 17 illustrate one of the heating elements 274 wherein similarly formed platen members 276 and 278 are arranged on either side of a heat-distributing intermediate plate 280. Each platen 276 and 278 is provided with a fluid inlet 282 and a fluid outlet 284 which are connected by suitable valving to allow the introduction and flow of heated fluid through the platens as indicated by the dashed lines 286 in FIG. 16 so as to provide the heat for the adhering and forming process, whereafter cooling fluid may be introduced through the platens to cool them and set the thermoplastic synthetic resinous material. This arrangement also allows a ganged operation to be employed as is illustrated in FIG. 18. In FIG. 18, a hydraulic or similar press having a base 286 is provided with uprights 288 carrying a pressure head 290 in fixed relation with respect to the base 286 and the base is provided with a hydraulically operated piston 292 which mounts a pressure plate 294. A stack of heating devices 296, 298, 300, 302, 304, 306 and 308 with intervening assemblys 310, 312, 314, 316, 318, 320 and 322, each of which is an assembly as in FIG. 19, are stacked between the reaction head 290 and the pressure head 294 whereafter the platens 276 and 278 of each heating device are heated and pressure is applied and, while pressure is maintained, the platens are then cooled to form a number of composite image devices or members as described above.

FIGS. 31-33 illustrate further modified methods of producing the three dimensional composites. In FIG. 33, a sandwich S composed of the metallic lenticular screen-forming die 350, the thermoplastic synthetic resinous sheet 352, the image sheet 354 and a rigid metallic backing plate 356 is introduced between the top and bottom roll assemblied 358 and 360. The first set of rolls 362, 364 are heating rolls whereas the second set comprises an upper heating roll 366 and a lower pressure roll 368, the third roll or set being an upper pressure roll 370 and a lower heating roll 372 followed by the next set which includes an upper cooling roll 374 and a lower pressure roll 376 followed by an upper pressure roll 378 and a lower cooling roll 380 and the last two sets of rolls comprise the upper cooling rolls 382 and 384 and the lower cooling rolls 386 and 388. When the sandwich S has progressed through the entire set of rollers, the top and bottom plates 350 and 356 are removed and the composite lenticular screen-image sheet which is removed in composite form.

In FIGS. 31 and 32, a heating chamber 400 is provided through which a continuous web or sheet of polyvinyl chloride 402 is fed from a supply 404 thereof and the web, thus heated, issues from the heater to pass between guide rolls 406 and 408 to be positioned between the upper and lower forming heads 410, 412 which are adapted to remove relatively toward each other and sandwich the sheet 402 therebetween. The upper member 410 carries the lenticular screen-forming dye 414 whereas the lower head 412 carries the image sheet 416. After the members 410 and 412 have been moved toward each other to form the lenticular surface and adhere the sheet 402 to the underlying image member 416, the sheet 402 is advanced a predetermined distance and the next operation takes place, the laminated picture consisting of the image sheet 416 and overlying lenticular screen 418 ultimately pass to a cutter device 420 wherein the laminated sheet is cut into the proper size. Guide rollers 422 and 424 may be provided to support and guide the laminated members as they issue beyond the forming 410 and 412.

As will be seen more particularly in FIG. 31, the image sheet 416 may issue from a supply roll 426 thereof between suitable guide means 428 and, after each operation or preferably, incidental to the bringing together of the two heads 410 and 412, the image sheet is cut so as to allow it to pass ultimately to the cutter assembly 420.

The embodiment of the image composite shown in FIG. 30 is particularly advantageous for transparencies wherein the composite is viewed by light passing therethrough. The lenticular viewing screen is indicated by the reference character 430 which overlies a translucent sheet 432. The two identical 3D images 434, 436 are printed directly on opposite surfaces of the translucent sheet 432 by conventional printing processes. When the color images are viewed through a back-lighted frame, the composite shown in FIG. 30 with one color image being indicated by the reference character 434 and the other image being indicated by the reference character 436, a much better color effect is achieved. With this particular method, the lineiform image sheets may be mass produced by means of printing processes such as gravure, offset, etc. and, in effect, a three dimensional transparency is formed which is viewed through the lenticular viewing screen 430.

FIGS. 34 and 35 show a still further modified form of composing method and apparatus which involves the utilization of a rotatable table 438 adapted to rotate in stepwise fashion in the direction indicated by the arrow 440. At a loading station indicated by the reference character 442, the image sheet and plain polyvinyl chloride sheet are placed and then the table is stepped to position this laminate beneath the hot press 444 which includes top and bottom members 446 and 448 as indicated in FIG. 35, the upper one of which carries the lenticular screen-forming die is released by retracting the members 446 and 448 and the table stepped to the cooling press station 450 where the cooling members 452 and 454 are engaged with the sandwich and, when the sandwiches cool, the table is stepped to the unloading station 456 wherein the sandwich consisting of the die plate, the image composite and the backing plate are removed from the apparatus.

The various composing techniques specified hereinabove may be modified or altered so long as the principal composing technique is employed. To more clearly illustrate the basic technique involved, reference is had now to FIG. 43. In FIG. 43, an enlarger is indicated generally by the reference character 500, including a body 502 containing a light source 504 and having a lens system indicated generally by the reference character 506. The image negatives or film strip is indicated generally by the reference character 508 and contains a series of image sections 510, 512, 514, 516, and 518 which are the images produced by a plurality of side-by-side cameras having their axes parallel as described hereinabove. Each one of these images is sequentially exposed onto the composite consisting of the photosensitive film strip 520 and its overlying lenticular screen 522 in the printing table assembly indicated generally by the reference character 524. As shown, the printing table has a cover member 526 hinged as at 528 so as to be disposed in the covering position to the photosensitive device as shown, or swung aside to allow the image to be projected onto the composite by means of the enlarger 500. In each of the negatives 510–518, the mark 530 is intended to show the same object point in each of the various aspects of the scene photographed and prior to each exposure of the composite 520, 522, the cover 526 is swung into the covering position as shown and the selected image 510–518 is projected onto the cover 526 such that the projected mark 530' in each case is at a precisely lined point on the cover 526. This point 530', then, becomes the center plane image as is depicted in FIG. 42a–42c.

In FIG. 42a, the object 532 of each scene has been selected as the center plane image and when viewed by the observer's eyes, this portion of the scene will appear to be in the plane of the composite 534 whereas foreground objects 536 will appear to be floating out of the image plane while background objects 538 will appear to be receding with respect to the image plane of the object 532. With reference to FIG. 42b, the scene is depicted as in FIG. 42a but, in this case, the object 538 has been chosen for the center plane image portion of the scene such that the object 532 will appear to be floating out of the image plane whereas the object 536 will appear to be floating still farther out of the image plane, substantially as is diagrammatically illustrated.

Alternatively, as is shown in FIG. 42c, the object 536 may be selected as the image plane object such that the two objects 532 and 538 will therefore recede behind this image plane in the fashion shown.

A different technique is shown in FIGS. 36 and 37 wherein the composite displays no center plane. In FIG. 36, the composite is indicated generally by the reference character 550. In this case, the same two dimensional image from a negative is projected by a suitable enlarger onto the composite 550 with the negative moving from the position 552 to the position 560, intermediate positions 554, 556 and 558 also being shown. During the exposure with the negative moving, a correlated movement of the composite 550 is effected as indicated by the arrows 562, the movements imparted to the negative and to the composite 550 being such that the lineiform images produced collectively fill the areas beneath each lenticle of the composite. With the negative and the composite moving in the same direction during the exposure, the entire image as viewed will appear to recede behind the plane of the composite.

Exactly the opposite effect can be achieved by following the steps shown in FIG. 37. In FIG. 37, sequential positions of the negative are designated by the reference characters 564, 568, 570, and 572 while the composite 574 is moved as indicated by the arrows 576 in the opposite direction. In this case, the image as veiwed will appear to float out of the plane of the composite.

A slightly different technique is illustrated in FIGS. 8 and 9. In this general technique, a number of enlargers 580, 582, 584, 586 and 588 are fixedly arranged so as to converge, as indicated by the point 590, at the surface of the composite 592. Each of the enlargers 580–588 is to project one of the images from the cameras disposed with their axes parallel as described hereinabove. The images are simultaneously exposed while the composite 592 is rocked as indicated by the dashed lines in FIG. 8. Rocking of the composite during exposure causes the lineiform images to fill completely the area beneath each lenticle. That is to say, in any one position of the composite, the condensed images from each projector fill lineiform areas which are spaced from each other. Thus, the extreme positions 594 and 596 of the rocking motion are chosen to cause these condensed images to spread into contiguous and filling relation beneath each lenticle.

Figure 38A:
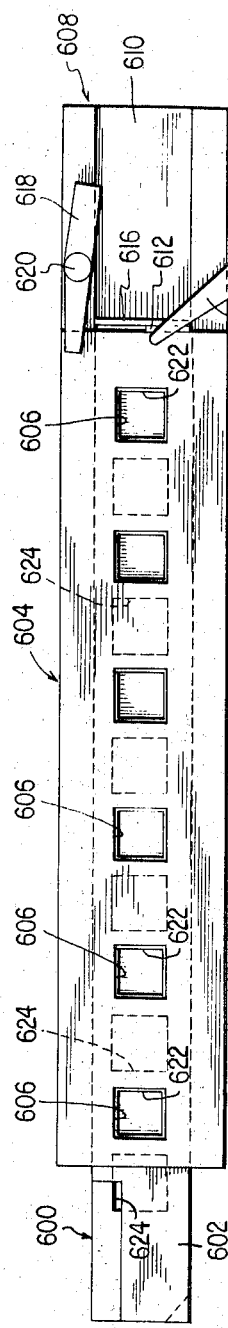

A shutter assembly for a multi-lens camera is illustrated in FIGS. 38a–38d. FIG. 38a shows the mechanism at the completion of an exposure, the shutter control plate 600 and the cocking control plate 602 being in the home or rest positions relative to the fixed frame member 604. The frame member 604 is provided with a series of apertures 606 equal in number to and aligned with the several lenses of the camera. A guide member 608 is secured to the rear of the frame plate 604 and defines a guide channel 610 therewith, within which the shutter and cocking control plates are received for sliding motion.

Figure 38B:
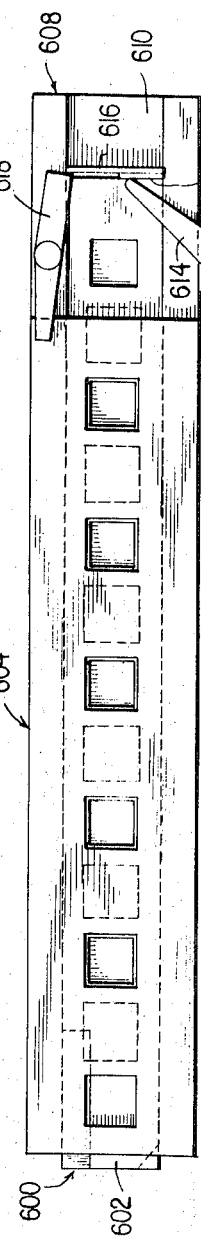

The cocking control plate 602 is provided with an ear or flange 612 cooperable with the cocking lever 614 so that the cocking control plate 602, together with the shutter control plate 600, may be moved to the position shown in FIG. 38b. The ear or flange 616 on the shutter control plate 600 causes such plate to move to cocked position (FIG. 38b) when the cocking lever 614 is actuated. Th plate 600 is held in cocked position by the release member 618 which is pivoted at 620 and normally spring urged to engage behind the flange 616 as shown in FIGS. 38b and 38c to retain the plate 600 in cocked position.

Figure 38C:
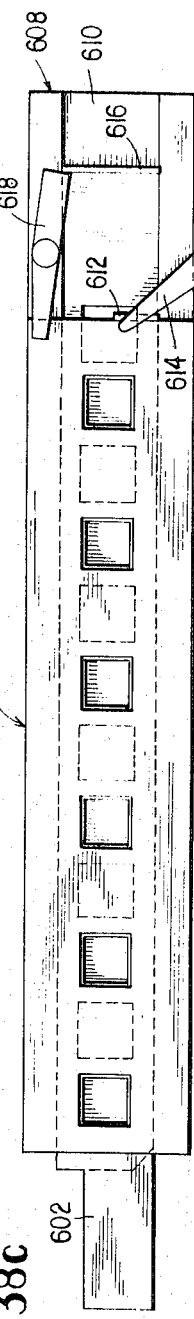

After the cocking movement, the lever 614 returns to its rest position, FIG. 38c, and so does the plate 602. Suitable spring means are provided for these purposes.

Figure 38D:
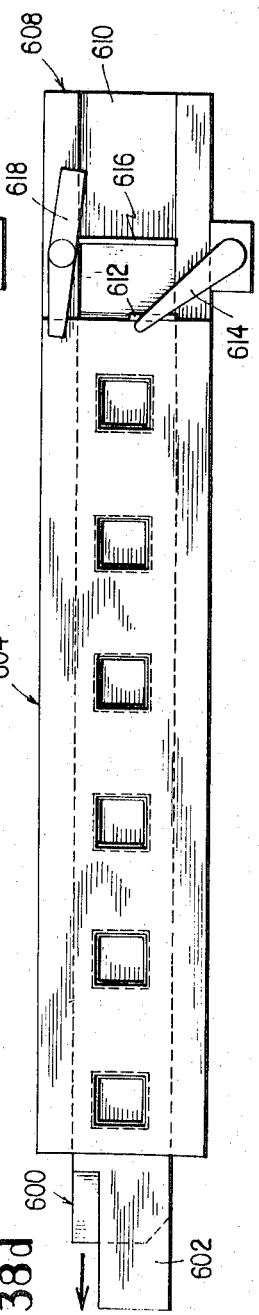

It will be noted that the cocking control plate 602 is provided with apertures 622 which are in register with the corresponding apertures 606 when the plate is in its rest position, FIGS. 38a, 38c and 38d. The shutter control plate, on the other hand, is provided with apertures 624 which are out of register with the openings 606 in either the position shown in FIG. 38a or the positions shown in FIGS. 38b and 38c.

During the cocking movement, the two plates 600 and 602 moving in unison but out of registry will allow the cocking action without permitting light to pass through the apertures 606. After the shutter control plate 600 has been moved to cocked position and the cocking control plate has returned to its rest position, FIG. 38c, release of the shutter control plate allows full simultaneous full exposure through all of the apertures 606 as the shutter control plate is returned to its released position. Such condition is shown in FIG. 38d, it being understood that suitable spring means is provided for rapidly returning the shutter control plate to its final position, FIG. 38a.

Alternatively, a double acting shutter such as is shown in FIGS. 39, 40 and 40a may be employed. In this configuration, only two shutter plates 630 and 632 are employed, each having a lateral flange 634 or 636. The plate 630 and the plate 632 are slidable with respect thereto through the medium of the motion-transmitting rod or member 638. Screw thread 640 is provided between the flanges 634 and 636 normally to urge the plates to a relative position (not shown) in which the corresponding apertures 642 and 644 thereof are out of registry. When the shutter is actuated, the rod 638 causes the plate 632 to move to the relative position shown in FIGS. 39 and 40 whereat full registry is effected between the various apertures 642 and 644, at which point the actuating mechanism for the rod 638 releases same to allow the plate 632 to return to its rest position, an intermediate position thereof being shown in FIG. 40a.

The plate 650 of FIGS. 41a–41c is used for the purpose of selecting the number of exposures which are made. In the position shown in FIG. 41a, the several camera lenses 652, 654, 656, 658 and 660 are all exposed for operation due to registry of the respective plate openings 662, 664, 666, 668, and 670 therewith. In FIG. 41b, the plate 650 has been shifted so that only the two lenses 658 and 660 are exposed through the apertures 672 and 674 whereas, in FIG. 41c, another position of the plate is shown such that only the lens 660 is exposed (FIG. 41b) to provide one stereoscopic pair, or all of the camera lenses may be used to provide the several negatives producing a number of available stereoscopic pairs.

In FIGS. 44–49, an arrangement for a multi-lens camera is shown. The camera includes a housing 680 within which the body 682 of a multi-lens camera is fixed and the front wall 684 of the housing may be provided with the selective exposure plate 650 described in conjunction with FIGS. 41a–41c. On the rear wall 686 of the housing, between the storage spool well 688 and the take-up well 690, a generally U-shaped guide track 692 is provided for receiving and guiding the photographic film as it issues from the standard supply container 694 received in the well 688 and passes into the take-up well 690. The well 688 is provided with the usual rewind device 696 to retrieve the exposed film from the well 690 and a film advancing drive sprocket device 698 and associated handle 700 are provided also.

An iris (or diaphragm) actuator bar 702 is provided simultaneously to actuate shutters associated with each of the lenses in response to manual actuation of the iris (diaphragm) button 704 and, as described in conjunction with FIGS. 41a–41c, one two or all of the lenses may be utilized. The film advance drive 698 is of course manipulated to feed the requisite amount of film for each exposure format which is to be followed.

The guide track 692 provides top and bottom channels receiving the edges of the film 706 as for example the channel 708 in FIG. 49, and the entrance mouth 710 for the take-up well 690 FIG. 45, is constructed to minimize friction at this point. Thus, one side of the entrance mouth presents the ribs 711 and 712 which engage the film 706 just inside the rows of drive sprocket holes 714 and 716 and the opposite edges of the film are guided between the shoulders 718 and 720 and the opposed inner ends of the recesses which are curved as indicated at 722 and 724. The film thus is lightly engaged but positively guided as it enters the well 690.

The body member 726 which defines the well 690 provides a smooth generally cylindrical inner surface 728 tangent to the entrance mouth 710 and provided in generally diametrically opposed relation to the entrance mouth with a rounded rib 730 serving to minimize friction between the film 706 and the surface 728 as the film is fed into the well 690. The natural tendency for the film to coil plus the pressure of the rib 730 assures that the coiled portion 732 of the film within the well 690 is in minimal contact with the surface 728, as shown in FIGS. 45 and 49.

It will be understood that the particular manner of fabricating the image strips according to this invention may take many forms. These image strips which present the lineiform images wherein the band beneath each lenticle is subdivided into a plurality of narrower lineiform image sections of which any two sections within each band form a stereoscopic pair, may be fabricated purely by photographic precesses such that the image strips are photographic prints, they may be printed from conventional printing plates derived from photographic negatives, or any other conventional method may be employed to produce the lineiform image strip which are observed through the lenticular screen.

It will be realized also that the images produced by the view presented to the observer's eyes may not be identical either with respect to the two eyes of the observer when viewing from one point or with respect to the image presented to both eyes at one head position as opposed to another head position. For example, at one head position, the observer may see a particular scene which includes a selected number of objects whereas from another head position, one or more of these objects may be missing from the scene. The missing objects will seem to disappear as the observer shifts his head. As another example, all objects may be the same but foreground objects may be shifted slightly from one scene to the next so that the effect of motion may be perceived. Also, the illusion of objects in motion may be presented by causing the object in the scene observed by one eye to be shifted slightly with respect to that object's position in the scene observed by the other eye.

We claim:

1. In a camera having a housing provided with a film supply well and a film take-up well, the improvement wherein said take-up well is formed by a body portion having a generally cylindrical inner surface, means providing a film entrance mouth into said take-up well substantially tangential to said inner surface, and a rounded rib formed on said inner surface substantially dimetrically opposite said entrance mouth for engagement with film entering said take-up well so as to tend to hold said film out of substantial frictional engagement with said inner surface.

2. In a camera as defined in claim 1, wherein said entrance mouth is formed between two body portions presenting a channel therebetween, one of the two body portions having spaced ribs and a shoulder adjacent each rib, the other body portion having recesses having curved inner ends opposite said shoulders.

* * * * *